United States Patent

Asars et al.

[15] 3,668,396

[45] June 6, 1972

[54] TELEVISION TYPE NUCLEAR RADIATION CAMERA SYSTEM

[72] Inventors: Juris A. Asars, Monroeville; Robert J. Schneeberger, Pittsburgh, both of Pa.

[73] Assignee: CGR Medical Corporation, Cheverly, Md.

[22] Filed: Nov. 10, 1969

[21] Appl. No.: 875,348

[52] U.S. Cl. ....................250/83.3 R, 178/6.8, 250/71.5 R, 250/213 VT

[51] Int. Cl. ....................H04n 3/00

[58] Field of Search ....................250/71.5 R, 83.3 R, 213 VT; 178/6.8

[56] References Cited

UNITED STATES PATENTS 3,107,276 10/1963 Cohen ....................178/6.8
3,462,601 8/1969 Sternglass ....................250/83.3 R
3,531,651 9/1970 Lieber et al....................250/213 VT X

*Primary Examiner*—Archie R. Borchelt
*Attorney*—F. H. Henson and C. F. Renz

[57] ABSTRACT

A television type camera system in which TV type scanning is used for readout of a spatially distributed nuclear radiation image. The scanning system provides means of time integration of the video pulses derived from a single radiation event and provides discrimination of the integrated pulses generated by a single event in the spatially distributed image. In one embodiment of the invention, conventional TV scanning is utilized and circuitry is associated with the system to permit time integration of the multiple video pulses derived from a single event for subsequent discrimination. A second embodiment utilizes a non-conventional scanning system to permit the electron scanning beam to stop and integrate a single event and subsequent discrimination of the signal.

5 Claims, 7 Drawing Figures

INVENTORS
Juris A. Asars and
Robert J. Schneeberger.
BY Charles F. Renz
ATTORNEY

TELEVISION TYPE NUCLEAR RADIATION CAMERA SYSTEM

BACKGROUND OF THE INVENTION

This invention relates to radiation detecting devices and more particularly to electron imaging systems for producing a presentation of the distribution and concentration of sources of radiation. This invention relates to an improvement to be type device described in U.S. Pat. No. 3,462,601 entitled "Radiation Detectors and Methods of Operation Therefor" by E. J. Sternglass and assigned to the same assignee as this invention. The device described therein utilizes an electron imaging system whereby an electron image corresponding to an X-ray or gamma scintillation could be greatly multiplied and read off of a target element by conventional television scanning techniques. The device, due to high energy conversion efficiency obtainable with such an electron image system, provided high resolution images with many distinguishable levels of activity with low doses of radioisotopes.

Gamma radiations emitted from a radioactive isotope consists of several fixed energies which are characteristic of that radioisotope. The collection of light produced by the scintillation in the crystal on the input of the image intensifier and the conversion of the light to the electrons by the photocathode results in statistical variation of pulse size. In addition, due to scattering of the rays, a background radiation signal is impressed upon the image intensifier. The use of a pulse-height analyzer or discriminator can eliminate most of this background. Since different radioisotopes have different principal gamma ray energies, the window of the pulse height analyzer may be set to bracket the principal peak of the desired isotopes.

In TV scanning, each scintillation is read off as a group of pulses and the stored spot on the target of the camera tube may cover several scan lines. The number and magnitude of these pulses depend on the gamma ray energy, the characteristics of the scanning pickup tube and the particular random location of the scintillation with respect to the scanning line. In a standard TV scanning system, the individual pulses are separated in time by about 63 microseconds.

To accomplish pulse height discrimination, it is therefore necessary in a TV scanning system to integrate the signal from the group of pulses belonging to a single scintillation event but separated in time by the horizontal scanning period of the system. The present TV type radioisotope cameras cannot effectively discriminate against background radiation because they are not designed to integrate the group of pulses belonging to a single event.

It is accordingly the general object of this invention to describe a system capable of time integration and subsequent discrimination of multiple video pulses generated by a single event.

SUMMARY OF THE INVENTION

This invention is directed to a television type radioisotope camera utilizing pulse height discrimination which provides time integration of multiple video pulses generated by a single event and subsequent discrimination of the integrated signal.

BRIEF DESCRIPTION OF THE DRAWING

For a better understanding of the invention, reference may be had to the accompanying drawing, in which.

BRIEF DESCRIPTION OF THE DRAWING

Figures 1, 2:
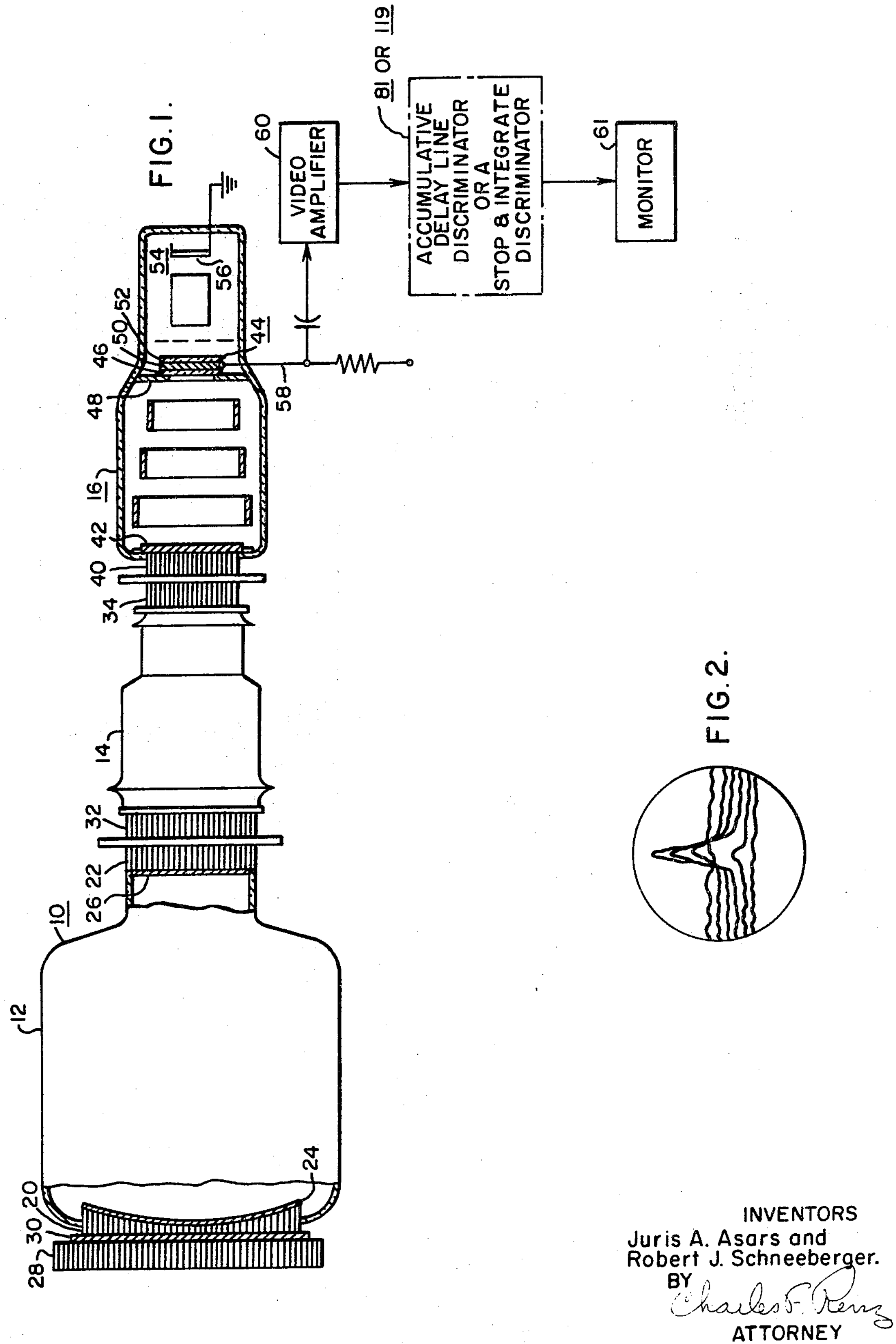
FIG. 1 is a schematic view of an isotope camera system in accordance with the teachings of this invention.
FIG. 2 illustrates typical video pulses derived from the pickup tube in FIG. 1 in response to a single event.

Referring now to FIG. 1, a scintillation camera system 10 is shown comprising an input image intensifier tube 12, an intermediate image intensifier tube 14 and an SEC camera tube 16. The input image intensifier tube 12 may be of any suitable type which includes an input fiber-optic window 20 and an output fiber-optic window 22. A suitable photocathode 24 is provided on the inner surface of the input window 20 and is responsive to input radiations for generating an electron image which is directed onto an output phosphor layer 26 provided on the inner surface of the output fiber-optic window 22. Suitable electrostatic lenses are provided for reducing the size of the electron image generated by the photocathode 24 which is focused onto the output phosphor 26. In addition, high voltage acceleration is provided between the photocathode 24 and the output phosphor 26, of the order of 25 KV, and in this manner provides an intensified image at the output window 22 of the radiation directed onto the photocathode 24.

In the specific embodiment shown, gamma radiation is directed onto a thin layer 30 of cesium iodide by a multi-apertured collimator 28. The layer 30 converts the gamma radiations into light scintillations to which the photocathode 24 is responsive. The fiber optic window 20 is provided between the layer 30 and the photocathode 24.

The intermediate image intensifier 14 is provided for additional amplification and is optically coupled to the output window 26 of the input image intensifier 12. The intermediate intensifier 14 is also provided with a fiber-optic input window 32 and a fiber-optic output window 34. A photoemissive surface (not shown) is provided on the inner surface of the fiber-optic window 32 which is responsive to the output from the output phosphor layer 26 of the input image intensifier 12. Again by suitable lenses and acceleration, the electrons from the photocathode of the intermediate amplifier 14 are accelerated onto an output phosphor provided on the output window 34. This further intensifies the image. The output image from the intensifier 14 is optically coupled by means of the output fiber-optic window 34 and an input fiber-optic window 40 of the SEC camera tube 16 to a photocathode 42 on the inner surface of the window 40. The electron image generated by the photocathode 42 is accelerated and focused onto a target member 44. The target element 44 consists of a support film 46 and it may be of a suitable insulating material such as aluminum oxide of a thickness of about 500 Angstroms and supported on a suitable support ring 48. A layer 50 of electrically conductive material such as aluminum is deposited on the support film 46. The thickness of the conductive layer 50 is about 500 Angstroms. A storage coating 52 is deposited on the conductive coating 50 of a suitable material such as an alkali or alkali earth metal compound. Potassium chloride, magnesium chloride and magnesium oxide are suitable materials. The layer 52 is a porous type coating. In a specific device, the coating 52 was of potassium chloride having a thickness of 25 microns and about 2 percent of the normal bulk density of the material. The SEC camera tube 16 in the system is more fully described in U.S. Pat. No. 3,213,316 by G. W. Goetze et al.

An electron gun 54 is provided for scanning the porous layer 52 of the target 44 and consists of at least a cathode 56. An electrical conductive lead 58 is connected to the conductive layer 50 and provides a means of deriving a signal from the target 44 in response to the radiation onto the system.

In the operation of system 10, gamma rays pass through the collimator 28 onto the scintillation crystal or layer 30. The layer 30 generates light in response to the gamma rays which is in turn transmitted through the fiber-optics input window 20 onto the photocathode 24. The electron image generated by the photocathode 24 is accelerated and focused onto the output phosphor 26 and is thus amplified by means of the image intensifier tube 12. The light image from the output phosphor 26 is directed onto the photocathode of the intermediate intensifier 14 and is again intensified and directed onto an output phosphor on the output window 34 of the intermediate intensifier. The output image of the intermediate intensifier 14 is directed onto the photocathode 42 of the camera tube 16 through the fiber-optic coupling and generates an electron image again corresponding to the input gamma radiation image. This electron image is then accelerated from the photocathode 42 onto the target 44 and produces a charge image on the porous layer 52 due to secondary electron conduction. This target 44 operates on the basis of the electrons from the photocathode 42 striking the porous layer 52 causing generation of secondary electrons and due to the high porosity of the layer 52 these secondary electrons enter the voids within the layer 52 and are conducted due to an electric field impressed across the layer 52 to the backplate 50. In normal secondary electron conduction operation, the backplate 50 would operate at a positive potential with respect to the normal equilibrium potential established on the porous layer 52 due to the scanning of the electron beam from the electron gun 54.

In conventional scanning, the signal derived from the lead 58 will read off each scintillation as a group of pulses since the storage spot on the target 44 may cover several scan lines. The number and magnitude of these pulses depend on the gamma ray energy, the characteristics of the scanning pickup tube, and the particular random location of the scintillation with respect to the scanning lines. In a standard TV scanning system, the individual pulses are separated in time by 63 microseconds. The line structure of a single scintillation is shown in FIG. 2 and illustrates the multiple pulse nature of the signal from a scintillation. To accomplish pulse height discrimination, it is necessary in a TV scanning system to integrate the signal in a group of pulses belonging to a single scintillation, but separated in time by horizontal scanning periods.

Figure 3:
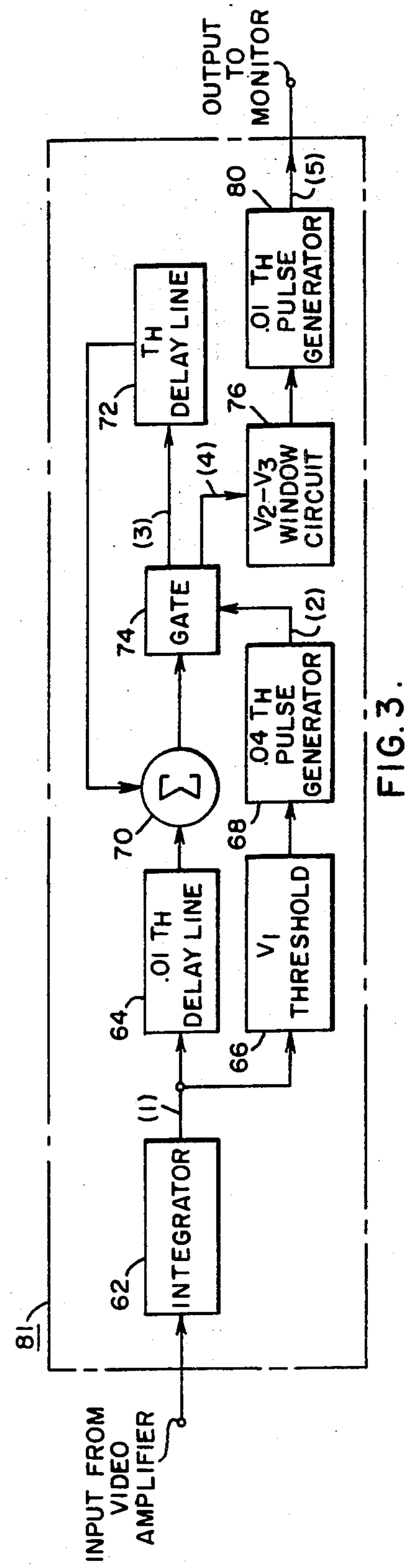
FIG. 3 illustrates a specific embodiment of an accumulative delay line discriminator that may be incorporated into the system shown in FIG. 1 in accordance with the teaching of this invention.
Figure 4:
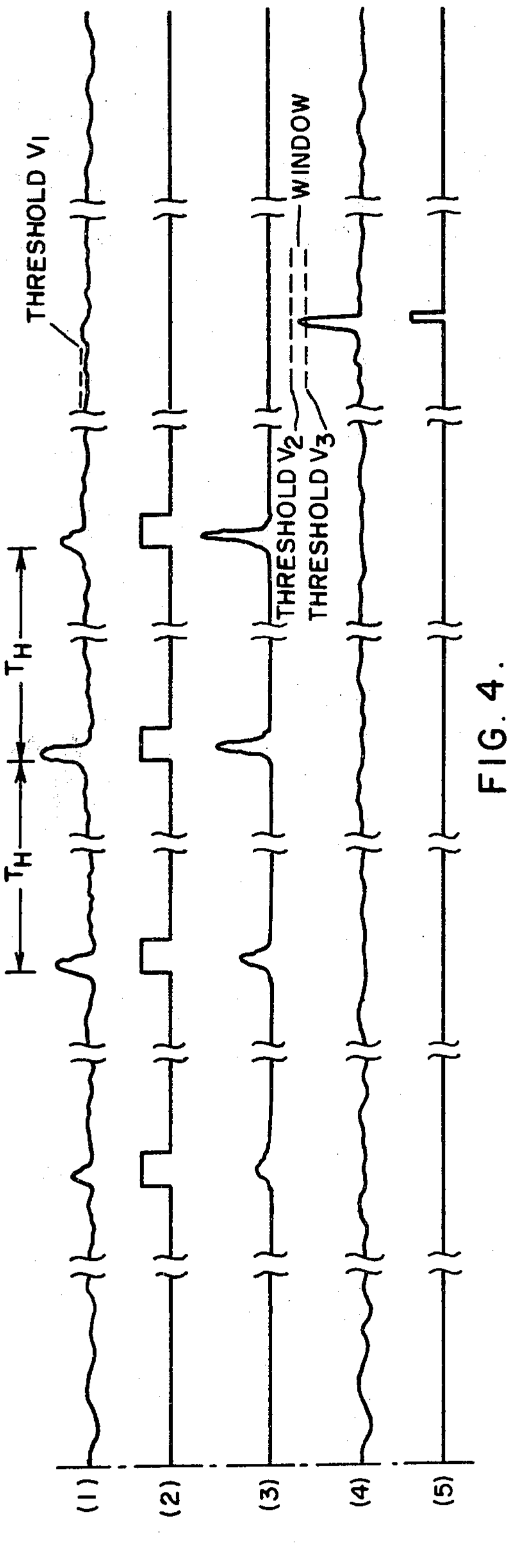
FIG. 4 illustrates the signals derived from the system of FIGS. 1 and 3 to describe the operation of the system.

The system in FIG. 3 illustrates a circuit 81 that may be used with FIG. 1 between the video amplifier 60 and the monitor 61 to obtain integration and discrimination of the scintillation event. FIG. 4 is representative of waveforms at various points in the circuit 81 illustrated in FIG. 3. The waveforms illustrated in FIG. 4 are of seven time intervals displaced by a horizontal sweep period, $T_H$, from each other and associated with seven scanned spatial lines taken in the same horizontal position and consecutive vertical positions. The signal from the video amplifier 60 is connected to an integrator circuit 62 including a 0.02 $T_H$ delay line and pulse shaper. Any suitable circuit may be utilized for the delay line integrator 62 and the signal output from the integrator 62 is illustrated by waveform 1 in FIG. 4. The amplitude of the output pulses from the integrator 62 is proportional to the charge read out by the electron beam from the corresponding horizontal line segment on the target 44. The output of the integrator 62 is connected to a 0.01 $T_H$ delay line 64, and then to a summing operational amplifier 70. If the output from the integrator 62 does not exceed a threshold value $V_1$, first time interval in FIG. 4, the output of delay line 64 is added to the output of delay line 72 and supplied through a gate 74 to a $V_2$–$V_3$ window circuit 76. If the integrator output 62 such as the second time interval, does exceed the threshold $V_1$ of the circuit element 66, such as a Schmidt trigger comparator a gate pulse illustrated by waveform 2 in FIG. 4 is generated by a pulse generator 68. The delay line 64 between the integrator 62 and a summing operation amplifier 70 centers in time the output pulse from the integrator 62 with respect to the gate pulse from the generator 68. The adder output in this second time interval is equal to the output of integrator 62 because of the absence of an input for the main delay line 72 during the interval (first) preceding this one by one horizontal sweep period $T_H$. During the gate pulse, the output of the adder 70 is diverted from the window 76 to the input of the main delay line 72. If it is assumed that the output pulse from integrator 62 in the second time interval represents the first portion of the charge distribution on the SEC target 44 read out by the scanning electron beam, then a second pulse delayed by one horizontal sweep period $T_H$ represents the next portion of the distribution read out as illustrated in the third time interval of FIG. 4. This second pulse arrives at the adder 70 at the same time as the first pulse from the main delay line 72 and their sum is diverted by the second gate pulse to the main delay line 72. This process is repeated for the third time and the last portion of the charge distribution as illustrated in the fourth and fifth time intervals of waveform of FIG. 4. Each output pulse from the integrator 62 is added to the previous sum stored in the unity gain main delay line loop. The new sums are diverted to the delay line input by the corresponding gate pulses. During the sixth time interval in the system as shown by the waveforms in FIG. 4, the integrator output pulse again does not exceed the threshold $V_1$ and the gate pulse is absent. The previous sum from the main delay line 72 is added to this minute value and then supplied to the comparator circuits of the window 76. If, and only if, the amplitude of this final sum exceeds threshold $V_3$ and does not exceed threshold $V_2$, a short pulse is supplied by a pulse generator 80. The pulse from generator 80 is displayed on the video monitor 61 as a single dot, displaced slightly down and to the right of the original charge distribution. The specific pulse lengths as well as integration and delay times are indicated to illustrate reasonable magnitudes. The minimum integration time and the minimum gate pulse duration depends on the size of the charge distribution and the maximum accumulative time error between the horizontal sweep periods and the main delay line. These, in turn, determine the maximum number of events which can be examined during any one scan field. The size of the charge distribution and the parameters indicated in the above example are compatible with an information rate of 50,000 events per second if their distribution is uniform both in time and in space, or approximately 2,000 events per second for an actual distribution in practice.

Figure 5:
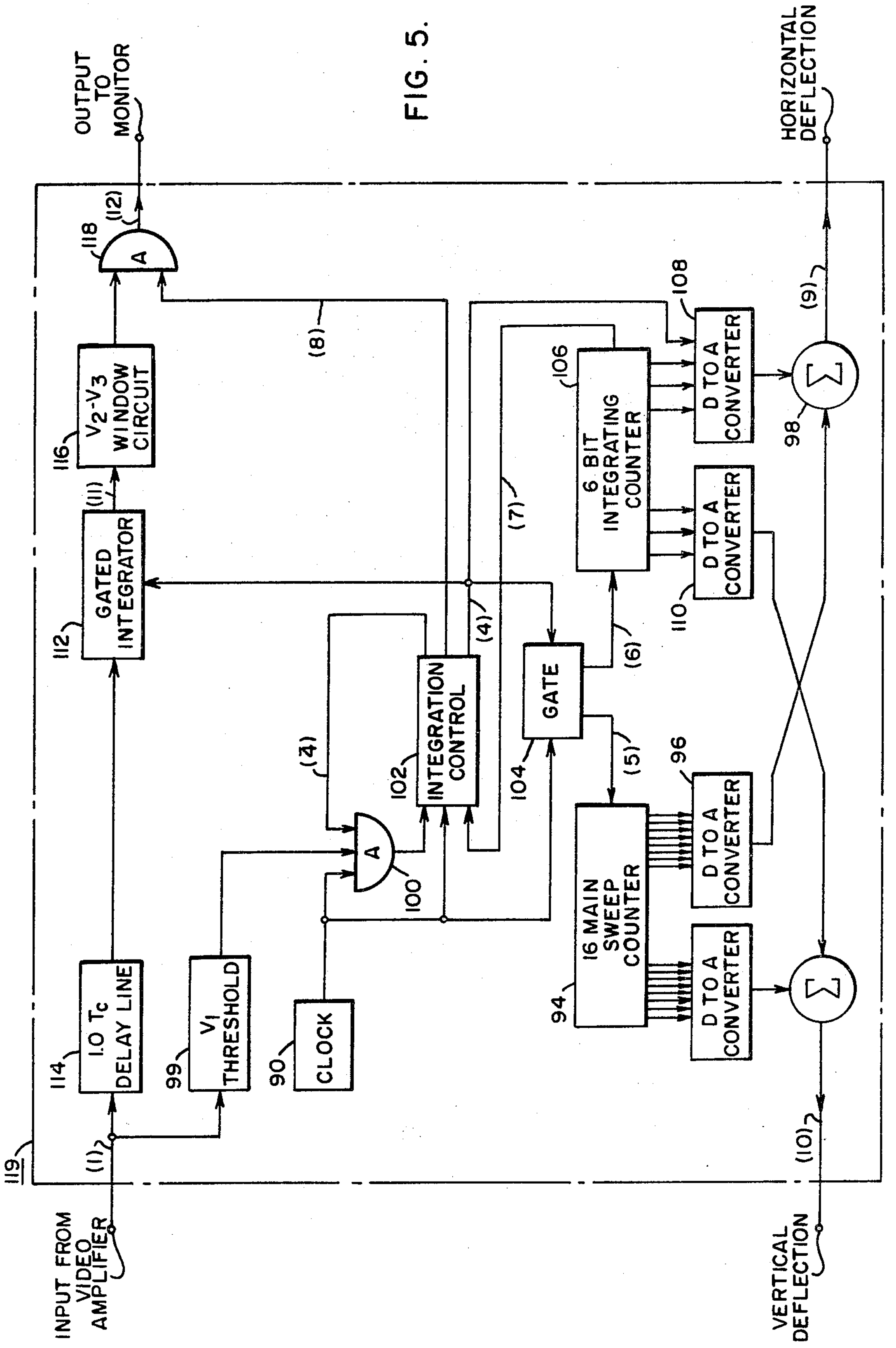
FIG. 5 illustrates a second embodiment to provide a stop and integrate type discriminator which may be incorporated with the system shown in FIG. 1 in accordance with the teaching of this invention.
Figure 6:
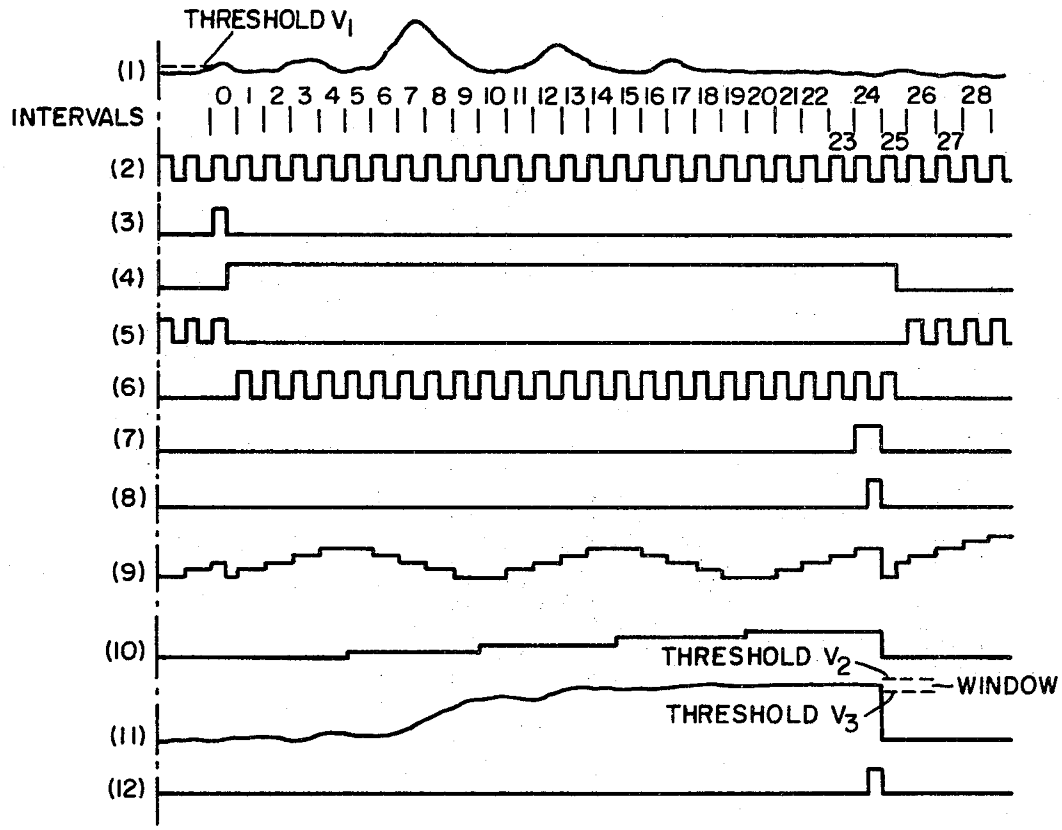
FIG. 6 illustrates the signals derived from the system of FIGS. 1 and 5 to describe the operation of the system.
Figure 7:
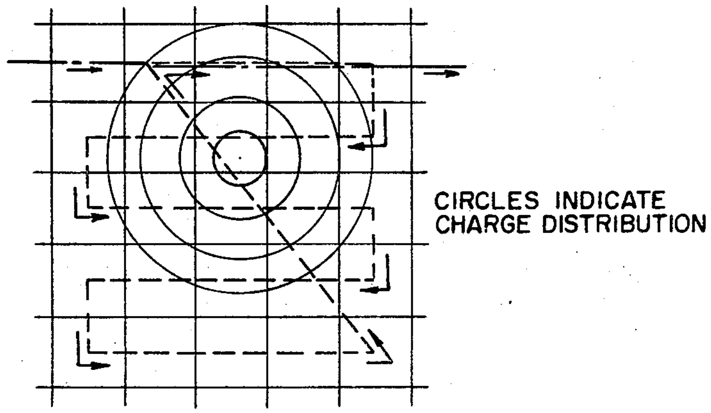
FIG. 7 illustrates the scan pattern of the electron beam on the storage electrode of the camera tube in connection with the circuit of FIG. 5.

In FIG. 5, there is illustrated another system 119 which may be incorporated between the video amplifier 60 and the monitor 61 of FIG. 1 which will stop and integrate the signal on the target and does not utilize standard scanning methods but generates, by digital means, horizontal and vertical electron beam position waveforms for both the camera tube 16 and the monitor 61. FIG. 5 is a block diagram of such a discriminator and includes the beam position waveform generators. The waveforms generated at the various points in the block diagram of FIG. 5 are illustrated in FIG. 6. FIG. 7 also indicates the position of the beam on a section of the target 44 at various times during the integration cycle represented by the waveforms in FIG. 6.

In the search mode, clock pulses generated by the clock circuitry 90 provide a waveform as indicated in waveform 2 in FIG. 6 with a period Tc (about 0.2 microsecond) and are supplied through a gate circuit 104 to a 16 bit main sweep counter 94. After digital to analog conversion by a circuit 96, eight of these bits are connected through a summing amplifier 98 to determine the horizontal position of the electron beam on the camera 16 and the monitor 61. In this illustration, the electron beam moves across the target from left to right and from top to bottom line by line. When the input from the video amplifier 60, waveform 1 of FIG. 6, exceeds the threshold $V_1$ of a circuit 99, detecting the upper left portion of a charge distribution on the target as indicated in the time interval 0 in FIG. 7, a pulse is supplied to the integration control circuit 102 through an AND circuit 100, waveform 3, and stops the search mode and starts an integration cycle. A gate signal from the integration control circuit 102, waveform 4, diverts the clock pulses from the main sweep counter 94 to the six bit integrating counter 106, waveform 6, via gate 104. After digital to analog conversion by circuit 108, three of these bits and the gate signal are added to the horizontal position, waveform 9, and the other three via converter 110 to the vertical position, waveform 10. In this example, the integration control 102 sweeps the electron beam through a five by five position matrix as indicated in FIG. 7. At the end of its cycle, this counter supplies, waveform 7, to the control circuit 102. This terminates the integration cycle and reverts the clock pulses back to the main sweep counter. This resumes the search mode at the same place on the SEC target where it was stopped. The gate signal from the integration control 102 also activates an integrator circuit 112 which receives the video input signal after delay of approximately one clock period $T_c$ by circuit 114. The integrated waveform 11 from this circuit is compared to the window thresholds $V_1$ and $V_2$ of circuit 116. At the termination of the integration cycle, the comparator circuit 118 outputs are sampled by a pulse from a control circuit, waveform 8. This supplies an output pulse to the monitor 61, waveform 12, if the integrand is higher than $V_3$ and lower than $V_2$. This embodiment illustrates a specific stop and integrate discriminator with a reasonable choice for resolution in an integration area. For this particular choice the total time required to sweep one field is given by $(2^{16}+25N)\ T_c$ where N is the number of charged distributions detected and examined in that field.

It is obvious that other modifications may be made within the spirit of the invention.

We claim:

1. A system for sensing radiation derived from a scene composed of a plurality of spatially disposed radiation sources, said system comprising means for collecting and converting said radiation into a corresponding electron image, means for receiving and establishing said electron image as a pattern of charges corresponding to said electron image, said means for receiving and establishing said electron image including a storage layer, said layer of storage material exhibiting the property of storing electrons and erasing said pattern of charges under the influence of a reading electron beam, means for scanning a reading electron beam over said storage layer in a plurality of line scans to derive a signal in response to said radiation sources in which the charge area on said storage surface in response to a radiation source is of a larger area than the diameter of spot size of said reading electron beam, circuit means associated with said target and said reading electron beam for deriving a signal from each line scan of said reading electron beam also responsive to said line scan signal above a predetermined amplitude for each line scan across said radiation source to accumulate said line scan signals from each line coincident with said radiation source to derive an accumulated signal representative of the total amplitude of said radiation source and means responsive to said line scan signal to permit passage of said accumulated signal of certain amplitudes and provide a visual representative of said accumulated signal.

2. The system in claim 1 in which the line scan signal is integrated after derivation from said target.

3. The system in claim 1 in which said circuit means is responsive to line scan signals above a first level to accumulate said line scan signals until the line scan signals decrease to value below said first value.

4. A system for sensing radiation derived from a scene composed of a plurality of spatially disposed radiation sources, said system comprising means for collecting and converting said radiation into a corresponding electron image, means for receiving and establishing said electron image as a pattern of charges corresponding to said electron image, said means for receiving and establishing said charge image including a storage layer, said storage layer exhibiting the property of storing of electrons for each of said radiation sources, means for scanning a reading electron beam over said storage layer, means for scanning said electron beam in a first predetermined pattern across said storage layer, a first circuit means responsive to a signal derived from said storage layer to modify said first scanning pattern of said electron beam to a second scanning pattern to scan an area substantially equal to the charge area on said storage layer corresponding to a single radiation source to derive an accumulated signal substantially corresponding to the total charge on said storage layer in response to said single radiation source.

5. The system in claim 4 in which said first circuit means is responsive to return said second scanning pattern to said first scanning pattern.

* * * * *